(12) United States Patent
Whitmer et al.

(10) Patent No.: US 11,260,954 B2
(45) Date of Patent: Mar. 1, 2022

(54) APPARATUS FOR ATTACHING AIRCRAFT WING STRUCTURAL COMPONENTS

(71) Applicant: The Boeing Company, Chicago, IL (US)

(72) Inventors: Brett D. Whitmer, Kenmore, WA (US); Kristopher Talcott, Seattle, WA (US); Tyler W. Downey, Bellevue, WA (US); Dan D. Day, Seattle, WA (US); Jean R. Paillant, Seattle, WA (US); Thanh Quach, Phoenix, AZ (US); Ian E. Schroeder, Seattle, WA (US); Jason H. Inouye, Bellevue, WA (US); William H. Graham, Moncks Corner, SC (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 16/596,878

(22) Filed: Oct. 9, 2019

(65) Prior Publication Data

US 2021/0107621 A1    Apr. 15, 2021

(51) Int. Cl.
*B64C 3/18* (2006.01)
*B64F 5/10* (2017.01)

(52) U.S. Cl.
CPC .............. *B64C 3/18* (2013.01); *B64C 3/182* (2013.01); *B64C 3/187* (2013.01); *B64F 5/10* (2017.01)

(58) Field of Classification Search
CPC .......... B64C 1/06; B64C 1/064; B64C 1/065; B64C 3/18; B64C 3/182; B64C 3/187; Y10T 403/32631; Y10T 403/32196; Y10T 403/32204; Y10T 403/32163; Y10T 403/32181; F16C 11/06; F16C 11/0614
See application file for complete search history.

(56) References Cited

U.S. PATENT DOCUMENTS

| | | | | |
|---|---|---|---|---|
| 1,986,149 | A * | 1/1935 | Harris | B62D 53/08 280/433 |
| 7,635,106 | B2 | 12/2009 | Pham et al. | |
| 7,784,734 | B2 * | 8/2010 | Christman | B64C 25/16 244/102 R |
| 9,587,670 | B2 * | 3/2017 | Matignon | B64F 5/50 |
| 10,040,537 | B2 | 8/2018 | Charles et al. | |
| 10,913,548 | B2 * | 2/2021 | Walker | B64D 45/02 |
| 11,038,334 | B2 * | 6/2021 | Walker | B64C 3/187 |
| 2013/0302083 | A1 * | 11/2013 | Matignon | B64F 5/50 403/122 |
| 2018/0072399 | A1 | 3/2018 | Walker et al. | |
| 2020/0223560 | A1 * | 7/2020 | Walker | F16B 37/047 |
| 2020/0227905 | A1 * | 7/2020 | Walker | B64C 3/187 |

* cited by examiner

*Primary Examiner* — Philip J Bonzell
(74) *Attorney, Agent, or Firm* — McDonnell Boehnen Hulbert & Berghoff LLP

(57) ABSTRACT

Examples include an apparatus configured for attaching a rib of an aircraft wing to a panel of the aircraft wing, the apparatus including: an insert that is configured to be attached, via an interference fit, to a hole in the rib; a shear tie including a socket at a first end of the shear tie, where the shear tie is configured to be attached to the panel at a second end of the shear tie; a ball stud including a shaft and a ball that is opposite the shaft, where the shaft is configured to be attached to the insert and the ball is configured to be positioned within the socket; and a fastener that is configured to secure the ball within the socket, thereby attaching the ball stud to the shear tie.

20 Claims, 9 Drawing Sheets

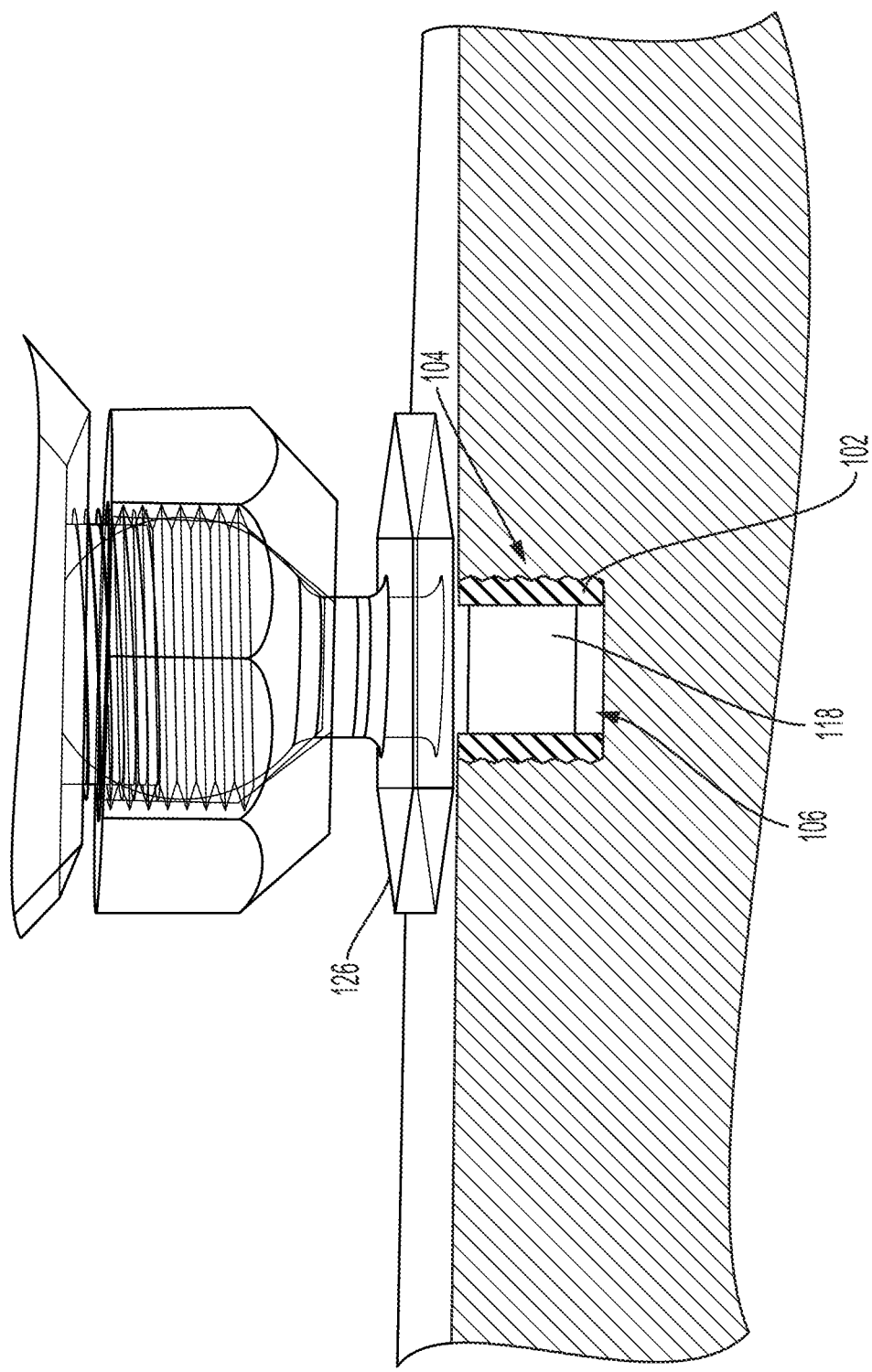

```
┌─────────────────────────────────────────────────────────────┐
│  POSITIONING AN INSERT WITHIN A HOLE OF THE RIB AND         │
│  FORMING AN INTERFERENCE FIT BETWEEN THE HOLE AND THE       │
│                         INSERT                              │
└─────────────────────────────────────────────────────────────┘
   302 ─┘           │
                    ▼
┌─────────────────────────────────────────────────────────────┐
│              ATTACHING A SHEAR TIE TO THE PANEL             │
└─────────────────────────────────────────────────────────────┘
   304 ─┘           │
                    ▼
┌─────────────────────────────────────────────────────────────┐
│         ATTACHING A SHAFT OF A BALL STUD TO THE INSERT      │
└─────────────────────────────────────────────────────────────┘
   306 ─┘           │
                    ▼
┌─────────────────────────────────────────────────────────────┐
│  PLACING A BALL OF THE BALL STUD THAT IS OPPOSITE THE       │
│        SHAFT INTO A SOCKET OF THE SHEAR TIE                 │
└─────────────────────────────────────────────────────────────┘
   308 ─┘           │
                    ▼
┌─────────────────────────────────────────────────────────────┐
│       SECURING THE BALL WITHIN THE SOCKET VIA A FASTENER    │
└─────────────────────────────────────────────────────────────┘
   310 ─┘
                                                        ↖ 300
```

APPARATUS FOR ATTACHING AIRCRAFT WING STRUCTURAL COMPONENTS

FIELD

The present disclosure generally relates to apparatus for attaching aircraft wing structural components, and more specifically to an apparatus for attaching a rib of an aircraft wing to a panel of an aircraft wing.

BACKGROUND

An aircraft wing generally includes several components that provide internal support or aerodynamic surfaces for the wing. For example, the wing can include ribs, stringers, spars, and skins, among other components. Ribs are generally interior structures that extend from a leading edge of the wing to the trailing edge of the wing. Ribs are typically spaced along the outboard/inboard directions of the wing. Spars and stringers generally extend from the fuselage to a tip of the wing in the outboard/inboard direction. Spars and stringers are generally attached to the ribs where the spars or stringers intersect the ribs. Stringers are generally bonded to an interior surface of a skin that forms an exterior (e.g., aerodynamic) surface of the wing.

Composite wings designs can include shear ties that attach ribs to stringers. Such shear ties are often designed to transfer not only translational forces from the skin to the rib, but also rotational moments from the skin to the rib. Shear ties that can transfer both translational forces and rotational moments can be heavy and bulky, which can adversely impact performance of the aircraft. However, depending on the location of the rib and/or the stringer, it is not always necessary for the shear tie to transfer rotational moments from the skin to the rib. Thus, a need exists for a lighter and less bulky attachment apparatus that can be used at areas of the wing where the transfer of rotational moments from the skin to a rib is not required.

SUMMARY

One aspect of the disclosure is an apparatus configured for attaching a rib of an aircraft wing to a panel of the aircraft wing, the apparatus comprising: an insert that is configured to be attached, via an interference fit, to a hole in the rib; a shear tie comprising a socket at a first end of the shear tie, wherein the shear tie is configured to be attached to the panel at a second end of the shear tie; a ball stud comprising a shaft and a ball that is opposite the shaft, wherein the shaft is configured to be attached to the insert and the ball is configured to be positioned within the socket; and a fastener that is configured to secure the ball within the socket, thereby attaching the ball stud to the shear tie.

Another aspect of the disclosure is an aircraft wing comprising: a rib comprising a hole; a panel; and an apparatus comprising: an insert that is attached, via an interference fit, to the hole; a shear tie comprising a socket at a first end of the shear tie, wherein the shear tie is attached to the panel at a second end of the shear tie; a ball stud comprising a shaft and a ball that is opposite the shaft, wherein the shaft is attached to the insert and the ball is positioned within the socket; and a fastener that secures the ball within the socket, thereby attaching the ball stud to the shear tie.

A further aspect of the disclosure is a method of attaching a rib of an aircraft wing to a panel of the aircraft wing, the method comprising: positioning an insert within a hole of the rib and forming an interference fit between the hole and the insert; attaching a shear tie to the panel; attaching a shaft of a ball stud to the insert; placing a ball of the ball stud that is opposite the shaft into a socket of the shear tie; and securing the ball within the socket via a fastener.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 8 is an enlarged assembled view of an apparatus and a rib, according to an example.

FIG. 9 is a block diagram of a method, according to an example.

DETAILED DESCRIPTION

As discussed above, there exists a need for a lighter and less bulky attachment apparatus that can be used at areas of the wing where the transfer of rotational moments from the skin to a rib is not required.

Within examples, an apparatus is configured for attaching a rib of an aircraft wing to a panel (e.g., a stringer) of the aircraft wing. The apparatus includes an insert that is configured to be attached, via an interference fit, to a (e.g., drilled) hole in the rib. The apparatus also includes a shear tie comprising a socket at a first end of the shear tie. The shear tie is configured to be attached to the panel at a second end of the shear tie. The apparatus also includes a ball stud having a shaft (e.g., a male threaded shaft) and a ball that is opposite the shaft. The shaft is configured to be attached to the insert (e.g., via a female threaded hole of the insert) and the ball is configured to be positioned within the socket. The apparatus also includes a fastener (e.g., a nut) that is configured to secure the ball within the socket, thereby attaching the ball stud to the shear tie.

The apparatus can be installed by positioning the insert within the hole of the rib and forming an interference fit between the hole and the insert, attaching the shear tie to the panel, attaching the shaft to the insert, placing the ball into the socket, and securing the ball within the socket via the fastener.

The apparatus can be advantageous because, when compared to conventional apparatus, the disclosed apparatus can provide a lighter and less bulky way to attach a rib to a panel of wing. The reduced weight of the apparatus can help increase the net amount of lift that the wing can provide. The disclosed apparatus can typically be installed using less fasteners when compared to conventional apparatus, potentially reducing material costs and manpower required for installation.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-8 depict an aircraft 5, apparatus 100, and/or functionality related to the method 300 shown in FIG. 9.

Figure 1:
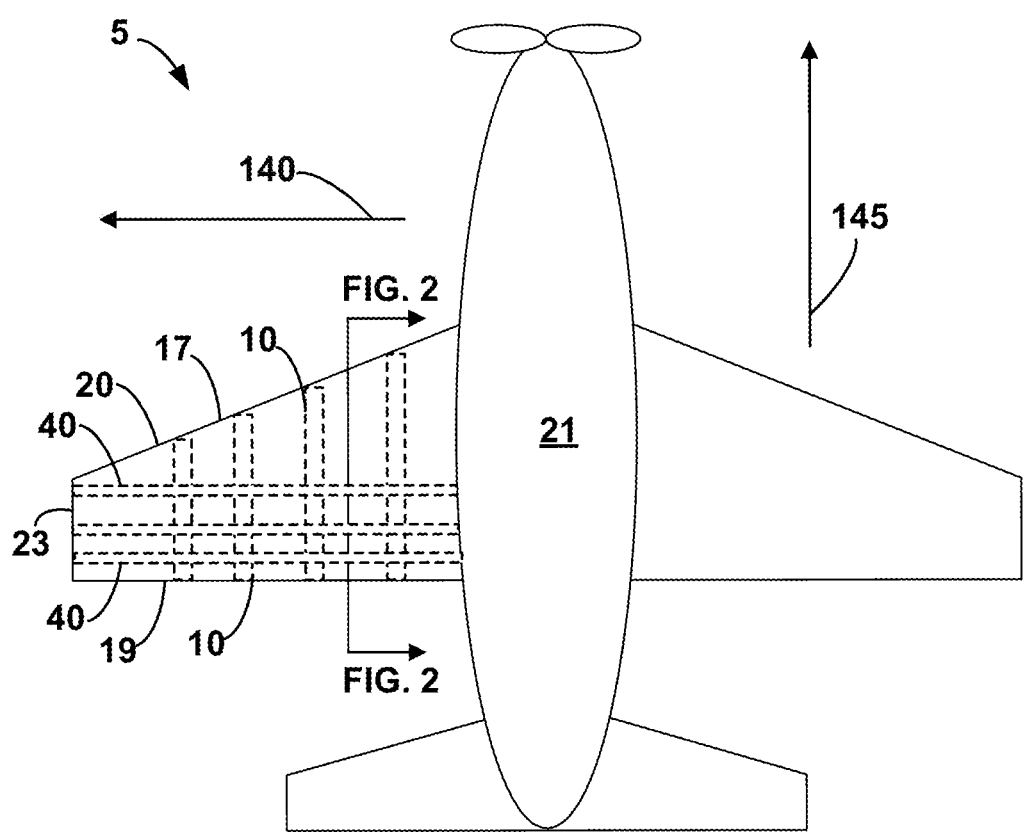
FIG. 1 is a schematic diagram of an aircraft, according to an example.

FIG. 1 is a schematic diagram of an aircraft 5 including an aircraft wing 20. The aircraft wing 20 includes several ribs 10 and several stringers 40 that form an internal structure or framework of the aircraft wing 20. The ribs 10 are dispersed along an outboard direction 140 of the aircraft 5 and extend substantially from a leading edge 17 of the aircraft wing 20 to a trailing edge 19 of the aircraft wing 20. The stringers 40 are dispersed along a forward direction 145 of the aircraft 5 and extend substantially from a fuselage 21 of the aircraft 5 to an outboard tip 23 of the aircraft wing 20. The stringers 40 are generally attached (e.g., via apparatus 100) to the ribs 10 where the stringers 40 and the ribs 10 intersect, forming substantially perpendicular angles.

Figure 2:
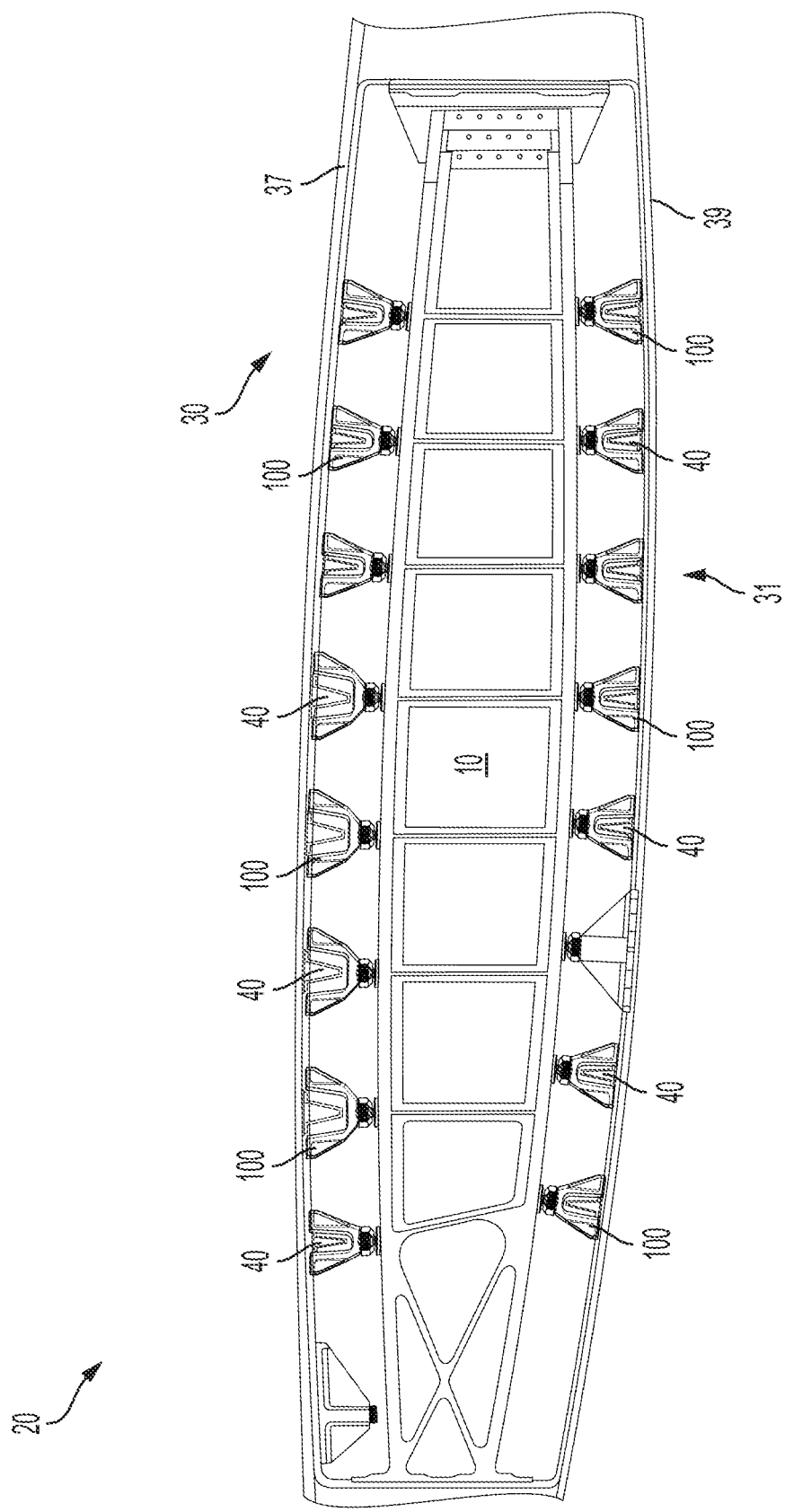
FIG. 2 is an inboard looking cross section of an aircraft wing of an aircraft, according to an example.

FIG. 2 is an inboard looking cross section of the aircraft wing 20. The aircraft wing 20 includes a panel 30 (e.g., an upper panel) that includes a skin 37 (e.g., an upper skin) and stringers 40 that are bonded via a thermoplastic weld or otherwise attached to an interior surface the skin 37. The aircraft wing 20 also includes a panel 31 (e.g., a lower panel) that includes a skin 39 (e.g., a lower skin) and stringers 40 that are bonded via a thermoplastic weld or otherwise attached to an interior surface of the skin 39. The aircraft wing 20 also includes several apparatus 100 that attach the rib 10 to the panel 30 or the panel 31.

The rib 10, the panel 30 (e.g., the skin 37 and the stringers 40 that are attached to the skin 37), and the panel 31 (e.g., the skin 39 and the stringers 40 that are attached to the skin 39) are typically formed of composite materials such as fiberglass, carbon fibers, or polymers.

Figure 3:
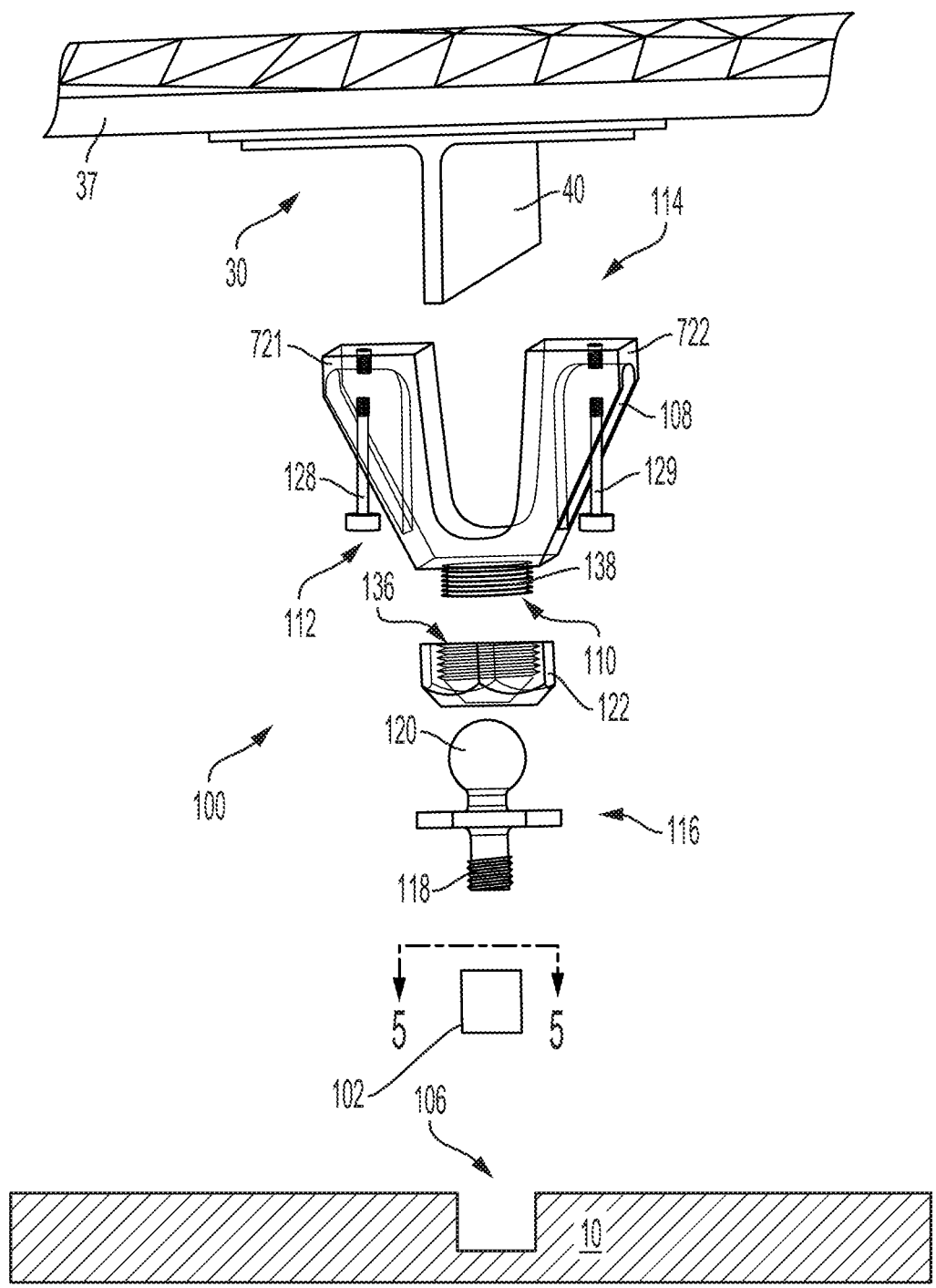
FIG. 3 is an exploded view of a panel, an apparatus, and a rib, according to an example.

FIG. 3 is an exploded view of the panel 30, an apparatus 100, and the rib 10. The apparatus 100 includes an insert 102, a shear tie 108, a ball stud 116, and a fastener 122. The rib 10 includes a hole 106 (e.g., a cylindrically shaped hole) that can be formed via core drilling.

The insert 102 has a cylindrical shape and is configured to be inserted into the hole 106 to form an interference fit or friction fit with the hole 106. For example, the insert 102 can be formed of metal and can be cooled significantly below room temperature (e.g., 72° F.) such that the insert 102 exhibits thermal contraction. Thereafter, the contracted insert 102 can be placed within the hole 106. The insert 102 is then warmed (e.g., by ambient surroundings), causing the insert 102 to expand and form an interference fit with the hole 106. For example, the insert 102 typically has an outer diameter that is 117-124% of the inner diameter of the hole 106 at room temperature, but other examples are possible. When the apparatus 100 is assembled, the insert 102 is typically flush with the rib 10 or recessed with respect to the rib 10. The insert 102 includes a female threaded hole that can mate with the ball stud 116.

The shear tie 108 is formed of metal and/or composite materials. The shear tie 108 includes a socket 110 at a first end 112 of the shear tie 108. The socket 110 is at least partially surrounded by male threads 138. The shear tie 108 is configured to be attached to the panel 30 at a second end 114 of the shear tie 108, for example, via a second fastener 128 and/or a third fastener 129. The second fastener 128 and the third fastener 129 typically take the form of bolts or screws that can be fastened to the stringer 40 and/or the skin 37.

The ball stud 116 is typically formed of metal and includes a shaft 118 and a ball 120 that is opposite the shaft 118. The shaft 118 is configured to be attached to the insert 102 and the ball 120 is configured to be positioned within the socket 110. The shaft 118 can take the form of a male threaded shaft that is configured to mate with the female threaded hole of the insert 102.

The fastener 122 can take the form of a (e.g., metal) threaded nut that is configured to secure the ball 120 within the socket 110, thereby attaching the ball stud 116 to the shear tie 108. The fastener 122 includes female threads 136 that are configured to mate with the male threads 138 to secure the ball 120 within the socket 110.

Figure 4:
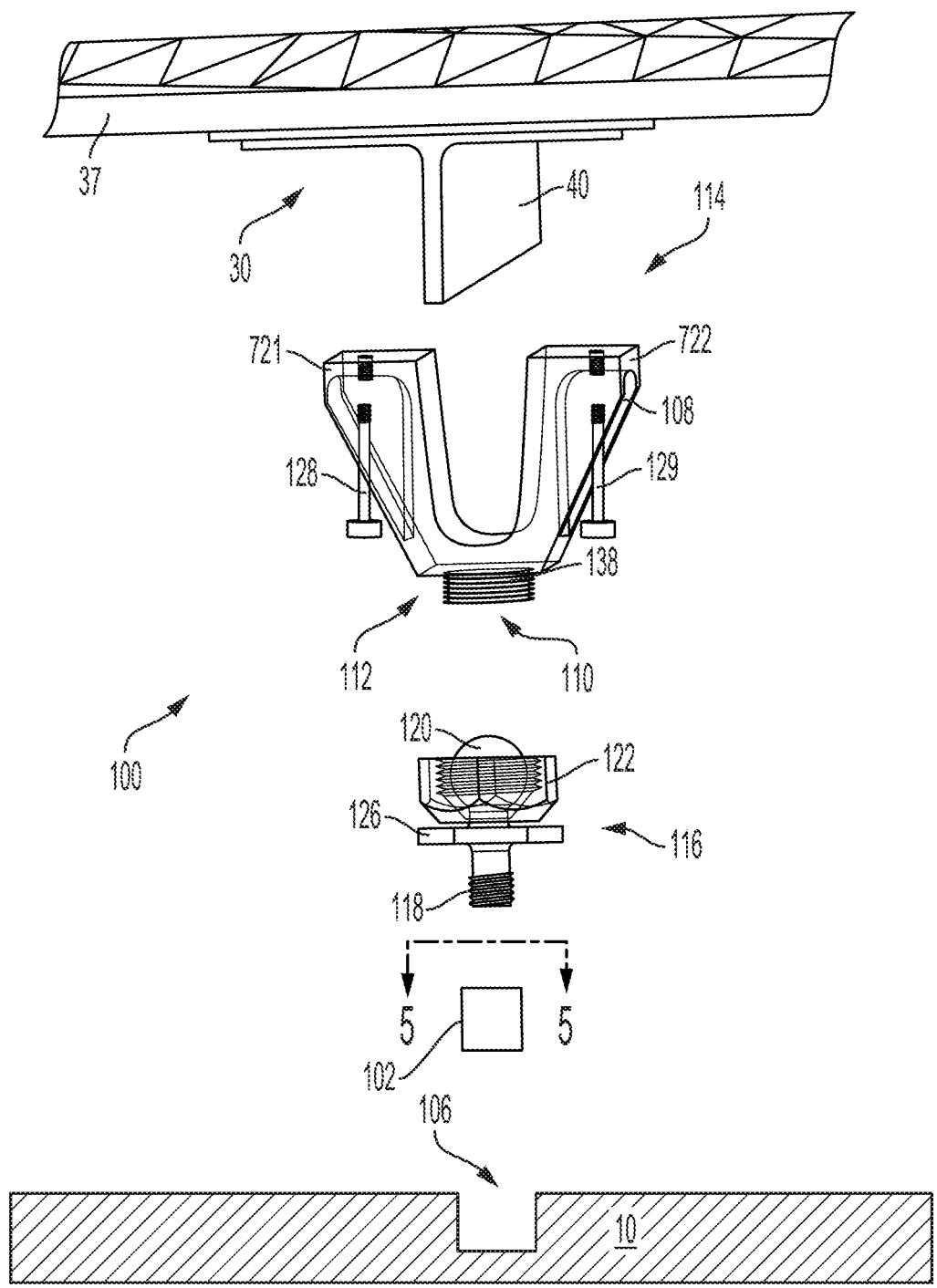
FIG. 4 is an exploded view of a panel, an apparatus, and a rib, according to an example.

FIG. 4 is another exploded view of the panel 30, the apparatus 100, and the rib 10. The ball stud 116 includes a shoulder 126 that is between the shaft 118 and the ball 120. FIG. 4 shows that the ball stud 116 and the fastener 122 are typically manufactured as a single component, with the fastener 122 being confined between a shoulder 126 of the ball stud 116 and the ball 120. This allows the female threads of the fastener 122 to mate with the male threads of the shear tie 108 to attach the ball stud 116 to the shear tie 108.

Figure 5:
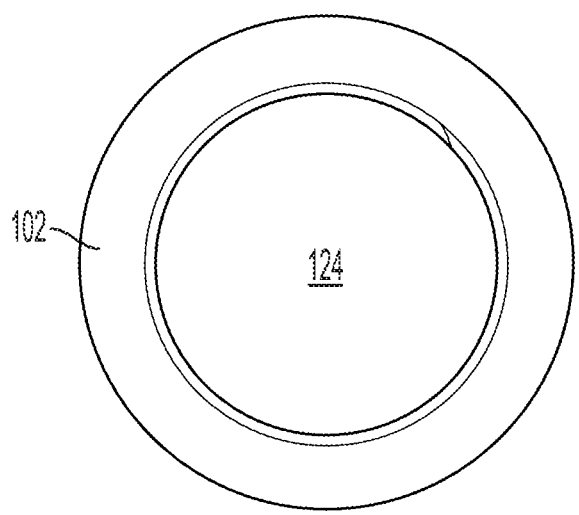
FIG. 5 is a schematic diagram of an insert, according to an example.

FIG. 5 is a top view of the insert 102 showing the female threaded hole 124 that is configured to mate with the shaft of the ball stud.

Figure 6:
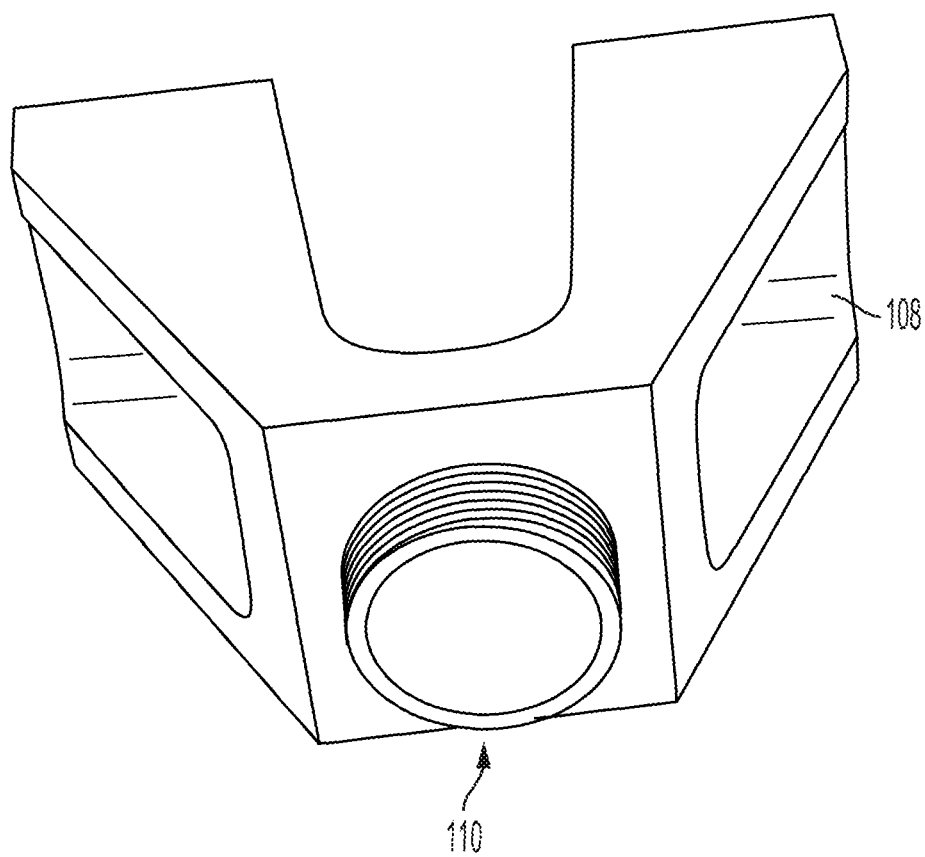
FIG. 6 is a perspective view of a shear tie, according to an example.

FIG. 6 is a perspective view of the shear tie 108, showing the socket 110 in more detail.

Figure 7:
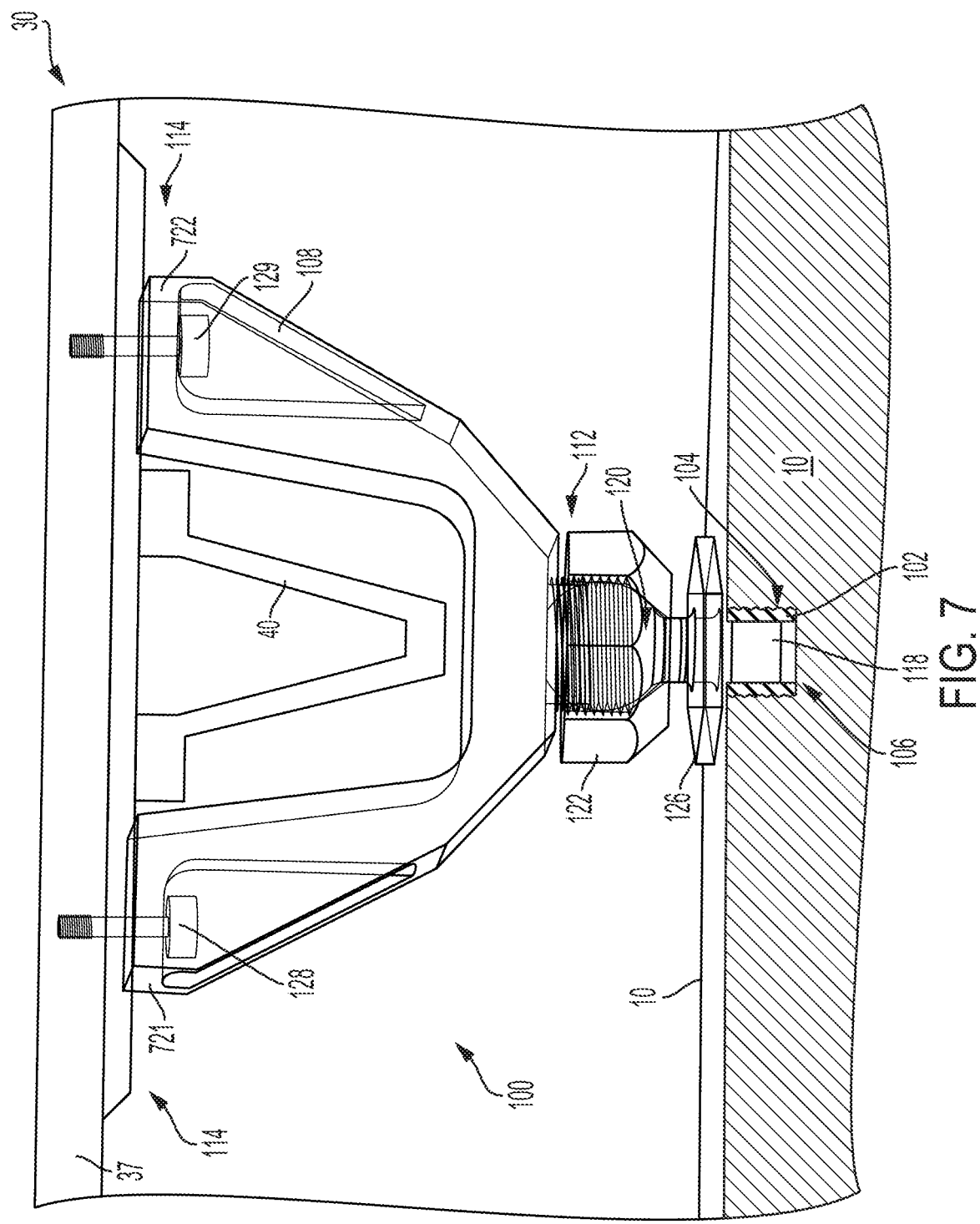
FIG. 7 is an assembled view of a panel, an apparatus, and a rib, according to an example.

FIG. 7 is an assembled (partial cross-section) view of the panel 30, the apparatus 100, and the rib 10. As shown in FIG. 7, the ball 120 is secured within the socket of the shear tie 108 by the fastener 122. As such, the ball 120 is also positioned within the fastener 122. The shoulder 126 is positioned against the rib 10 and, together with the threaded connection between the shaft 118 and the insert 102, the apparatus 100 is secured to the rib 10. As shown, the shear tie 108 includes a first arm 721 and a second arm 722. The first arm 721 is attached to the panel 30 (e.g., the skin 37 or the stringer 40) via the second fastener 128 and the second arm 722 is attached to the panel 30 (e.g., the skin 37 or the stringer 40) via the third fastener 129.

As such, the apparatus 100 attaches the rib 10 to the panel 30 and includes the insert 102 that is attached, via an interference fit 104, to the hole 106. The apparatus 100 also includes the shear tie 108 that includes the socket at the first end 112 of the shear tie 108. The shear tie 108 is attached to the panel 30 at the second end 114 of the shear tie 108. The apparatus 100 also includes the ball stud 116 including the shaft 118 and the ball 120 that is opposite the shaft 118. The shaft 118 is attached to the insert 102 and the ball 120 is positioned within the socket. The apparatus 100 also includes the fastener 122 that secures the ball 120 within the socket, thereby attaching the ball stud 116 to the shear tie 108.

The apparatus 100 is configured to transfer translational forces from the panel 30 to the rib 10 and configured to prevent rotational moments from being transferred from the panel 30 to the rib 10. This is at least partially due to the fact that, within examples, a connection between the apparatus 100 and the rib 10 can be approximated by a single point connection. Thus, there is generally very little or zero distance separating forces being transferred from the panel 30 by the apparatus 100 to the rib 10 that would enable a torque or rotational moment to be generated.

FIG. 8 is an enlarged assembled view of the apparatus 100 and the rib 10. FIG. 8 additionally shows the shoulder 126, the hole 106, the shaft 118, the insert 102, and the interference fit 104.

FIG. 9 is a block diagram of the method 300. FIG. 9 shows a flowchart of the method 300 for attaching the rib 10 to the panel 30, according to example implementations. The method 300 presents an example of a method that could be used with the apparatus 100 shown in FIGS. 1-8. As shown in FIG. 9, the method 300 includes one or more operations, functions, or actions as illustrated by blocks 302, 304, 306, 308, and 310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes positioning the insert 102 within the hole 106 of the rib 10 and forming the interference fit 104 between the hole 106 and the insert 102.

At block 304, the method 300 includes attaching the shear tie 108 to the panel 30.

At block 306, the method 300 includes attaching the shaft 118 of the ball stud 116 to the insert 102.

At block 308, the method 300 includes placing the ball 120 of the ball stud 116 that is opposite the shaft 118 into the socket 110 of the shear tie 108.

At block 310, the method 300 includes securing the ball 120 within the socket 110 via the fastener 122.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Examples of the present disclosure can thus relate to one of the enumerated clauses (EC) listed below.

EC 1 is an apparatus configured for attaching a rib of an aircraft wing to a panel of the aircraft wing, the apparatus comprising: an insert that is configured to be attached, via an interference fit, to a hole in the rib; a shear tie comprising a socket at a first end of the shear tie, wherein the shear tie is configured to be attached to the panel at a second end of the shear tie; a ball stud comprising a shaft and a ball that is opposite the shaft, wherein the shaft is configured to be attached to the insert and the ball is configured to be positioned within the socket; and a fastener that is configured to secure the ball within the socket, thereby attaching the ball stud to the shear tie.

EC 2 is the apparatus of EC 1, wherein the insert comprises a female threaded hole and the shaft is a male threaded shaft that is configured to be mated with the female threaded hole.

EC 3 is any of any of the apparatus of ECs 1-2, wherein the ball stud further comprises a shoulder between the ball and the shaft, the shoulder being configured to be positioned against the rib when the ball stud is attached to the insert and the insert is positioned within the hole.

EC 4 is the apparatus of any of ECs 1-3, wherein the shear tie is configured to be attached to a stringer of the panel.

EC 5 is the apparatus of any of ECs 1-4, wherein the shear tie is configured to be attached to the panel via a second fastener.

EC 6 is the apparatus of any of ECs 1-4, wherein the shear tie comprises a first arm and a second arm, and wherein the first arm is configured to be attached to the panel via a second fastener and the second arm is configured to be attached to the panel via a third fastener.

EC 7 is the apparatus of any of ECs 1-6, wherein the fastener is a nut comprising female threads and the shear tie comprises male threads that at least partially surround the socket, and wherein the fastener is configured to be attached to the shear tie via mating of the male threads and the female threads.

EC 8 is the apparatus of any of ECs 1-7, wherein the ball is configured to be positioned within the fastener.

EC 9 is an aircraft wing comprising: a rib comprising a hole; a panel; and an apparatus comprising: an insert that is attached, via an interference fit, to the hole; a shear tie comprising a socket at a first end of the shear tie, wherein the shear tie is attached to the panel at a second end of the shear tie; a ball stud comprising a shaft and a ball that is opposite the shaft, wherein the shaft is attached to the insert and the ball is positioned within the socket; and a fastener that secures the ball within the socket, thereby attaching the ball stud to the shear tie.

EC 10 is the aircraft wing of EC 9, wherein the insert is flush with the rib or recessed with respect to the rib.

EC 11 is the aircraft wing of any of ECs 9-10, wherein the insert comprises a female threaded hole and the shaft is a male threaded shaft that is mated with the female threaded hole.

EC 12 is the aircraft wing of any of ECs 9-11, wherein the ball stud further comprises a shoulder that is positioned against the rib.

EC 13 is the aircraft wing of any of ECs 9-12, wherein the panel comprises a stringer that is elongated along an outboard direction of the aircraft wing, and wherein the shear tie is attached to the stringer.

EC 14 is the aircraft wing of any of ECs 9-13, wherein the rib comprises one or more of fiberglass, carbon fibers, or a polymer, and wherein the insert is formed of metal.

EC 15 is the aircraft wing of any of ECs 9-14, wherein the shear tie is attached to the panel via a second fastener.

EC 16 is the aircraft wing of any of ECs 9-14, wherein the shear tie comprises a first arm and a second arm, and wherein the first arm is attached to the panel via a second fastener and the second arm is attached to the panel via a third fastener.

EC 17 is the aircraft wing of any of ECs 9-16, wherein the fastener is a nut comprising female threads and the shear tie comprises male threads that at least partially surround the socket, and wherein the fastener is attached to the shear tie via mating of the male threads and the female threads.

EC 18 is the aircraft wing of any of ECs 9-17, wherein the ball is positioned within the fastener.

EC 19 is the aircraft wing of any of ECs 9-18, wherein the apparatus is configured to transfer translational forces from the panel to the rib and configured to prevent rotational moments from being transferred from the panel to the rib.

EC 20 is a method of attaching a rib of an aircraft wing to a panel of the aircraft wing, the method comprising: positioning an insert within a hole of the rib and forming an interference fit between the hole and the insert; attaching a shear tie to the panel; attaching a shaft of a ball stud to the insert; placing a ball of the ball stud that is opposite the shaft into a socket of the shear tie; and securing the ball within the socket via a fastener.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus configured for attaching a rib of an aircraft wing to a panel of the aircraft wing, the apparatus comprising:
   an insert that is configured to be attached, via an interference fit, to a hole in the rib;
   a shear tie comprising a socket at a first end of the shear tie, wherein the shear tie is configured to be attached to the panel at a second end of the shear tie;
   a ball stud comprising a shaft and a ball that is opposite the shaft, wherein the shaft is configured to be attached to the insert and the ball is configured to be positioned within the socket; and
   a fastener that is configured to secure the ball within the socket, thereby attaching the ball stud to the shear tie.

2. The apparatus of claim 1, wherein the insert comprises a female threaded hole and the shaft is a male threaded shaft that is configured to be mated with the female threaded hole.

3. The apparatus of claim 1, wherein the ball stud further comprises a shoulder between the ball and the shaft, the shoulder being configured to be positioned against the rib when the ball stud is attached to the insert and the insert is positioned within the hole.

4. The apparatus of claim 1, wherein the shear tie is configured to be attached to a stringer of the panel.

5. The apparatus of claim 1, wherein the shear tie is configured to be attached to the panel via a second fastener.

6. The apparatus of claim 1, wherein the shear tie comprises a first arm and a second arm, and wherein the first arm is configured to be attached to the panel via a second fastener and the second arm is configured to be attached to the panel via a third fastener.

7. The apparatus of claim 1, wherein the fastener is a nut comprising female threads and the shear tie comprises male threads that at least partially surround the socket, and wherein the fastener is configured to be attached to the shear tie via mating of the male threads and the female threads.

8. The apparatus of claim 1, wherein the ball is configured to be positioned within the fastener.

9. An aircraft wing comprising:
   a rib comprising a hole;
   a panel; and
   an apparatus comprising:
      an insert that is attached, via an interference fit, to the hole;
      a shear tie comprising a socket at a first end of the shear tie, wherein the shear tie is attached to the panel at a second end of the shear tie;
      a ball stud comprising a shaft and a ball that is opposite the shaft, wherein the shaft is attached to the insert and the ball is positioned within the socket; and
      a fastener that secures the ball within the socket, thereby attaching the ball stud to the shear tie.

10. The aircraft wing of claim 9, wherein the insert is flush with the rib or recessed with respect to the rib.

11. The aircraft wing of claim 9, wherein the insert comprises a female threaded hole and the shaft is a male threaded shaft that is mated with the female threaded hole.

12. The aircraft wing of claim 9, wherein the ball stud further comprises a shoulder that is positioned against the rib.

13. The aircraft wing of claim 9, wherein the panel comprises a stringer that is elongated along an outboard direction of the aircraft wing, and wherein the shear tie is attached to the stringer.

14. The aircraft wing of claim 9, wherein the rib comprises one or more of fiberglass, carbon fibers, or a polymer, and wherein the insert is formed of metal.

15. The aircraft wing of claim 9, wherein the shear tie is attached to the panel via a second fastener.

16. The aircraft wing of claim 9, wherein the shear tie comprises a first arm and a second arm, and wherein the first arm is attached to the panel via a second fastener and the second arm is attached to the panel via a third fastener.

17. The aircraft wing of claim 9, wherein the fastener is a nut comprising female threads and the shear tie comprises male threads that at least partially surround the socket, and wherein the fastener is attached to the shear tie via mating of the male threads and the female threads.

18. The aircraft wing of claim 9, wherein the ball is positioned within the fastener.

19. The aircraft wing of claim 9, wherein the apparatus is configured to transfer translational forces from the panel to the rib and configured to prevent rotational moments from being transferred from the panel to the rib.

20. A method of attaching a rib of an aircraft wing to a panel of the aircraft wing, the method comprising:
   positioning an insert within a hole of the rib and forming an interference fit between the hole and the insert;
   attaching a shear tie to the panel;
   attaching a shaft of a ball stud to the insert;
   placing a ball of the ball stud that is opposite the shaft into a socket of the shear tie; and
   securing the ball within the socket via a fastener.

* * * * *